US009244446B2

(12) United States Patent
Bhageria et al.

(10) Patent No.: US 9,244,446 B2
(45) Date of Patent: Jan. 26, 2016

(54) CONFIGURING, OPTIMIZING AND MANAGING MICRO-GRIDS

(71) Applicant: INTERNATIONAL BUSINESS MACHINES CORPORATION, Armonk, NY (US)

(72) Inventors: Gopal K. Bhageria, Overland Park, KS (US); Jean-Gael F. Reboul, Kenmore, WA (US); Matthew B. Trevathan, Kennesaw, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 537 days.

(21) Appl. No.: 13/688,679

(22) Filed: Nov. 29, 2012

(65) Prior Publication Data
US 2014/0148960 A1 May 29, 2014

(51) Int. Cl.
G05B 15/02 (2006.01)
G05B 17/02 (2006.01)
H02J 13/00 (2006.01)
H02J 3/00 (2006.01)

(52) U.S. Cl.
CPC ............... G05B 15/02 (2013.01); G05B 17/02 (2013.01); H02J 13/0086 (2013.01); H02J 2003/001 (2013.01); H02J 2003/007 (2013.01)

(58) Field of Classification Search
CPC ..... G05B 15/02; G05B 17/02; H02J 13/0086; H02J 2003/007; H02J 2003/001
See application file for complete search history.

(56) References Cited

U.S. PATENT DOCUMENTS

| 7,155,320 | B2 | 12/2006 | Gee | |
|---|---|---|---|---|
| 8,315,745 | B2 | 11/2012 | Creed | |
| 8,401,709 | B2 | 3/2013 | Cherian et al. | |
| 9,026,259 | B2* | 5/2015 | Zadeh et al. | 700/291 |
| 2004/0158360 | A1* | 8/2004 | Garland et al. | 700/286 |
| 2007/0124026 | A1 | 5/2007 | Troxell et al. | |
| 2009/0206666 | A1* | 8/2009 | Sella et al. | 307/43 |
| 2010/0179704 | A1 | 7/2010 | Ozog | |
| 2010/0274407 | A1 | 10/2010 | Creed | |

(Continued)

FOREIGN PATENT DOCUMENTS

| CN | 102184475 | 9/2001 |
|---|---|---|
| EP | 2512106 A1 | 10/2012 |
| WO | 2011040656 | 4/2011 |

OTHER PUBLICATIONS

Damchi Y. et al., "Optimal Coordination of Directional Overcurrent Relays in a Microgrid System Using a Hybrid Particle Swarm Optimization", 2011 International Conference on Advanced Power System Automation and Protection, (APAP), vol. 2, pp. 1135-1138, Oct. 16, 2011.

Kennedy J. et al., "Intelligent Load Management in Microgrids", Power and Energy Society General Meeting, 2012 IEEE, 8 pages, Jul. 22, 2012.

(Continued)

Primary Examiner — Ramesh Patel
(74) Attorney, Agent, or Firm — Lisa Ulrich; Roberts Mlotkowski Safran & Cole, P.C.

(57) ABSTRACT

Methods and systems for controlling electrical distribution grids. The method includes determining premises in an electrical distribution grid that include an energy resource. The method further includes determining a configuration of the electrical distribution grid including a micro-grid, the micro-grid including the one or more premises. The method further includes electrically isolating, monitoring and controlling the micro-grid from the electrical distribution grid through the use of a micro-grid manager.

25 Claims, 8 Drawing Sheets

(56) References Cited

U.S. PATENT DOCUMENTS

| | | | |
|---|---|---|---|
| 2011/0046798 A1* | 2/2011 | Imes et al. | 700/286 |
| 2011/0093127 A1* | 4/2011 | Kaplan | 700/292 |
| 2011/0231028 A1* | 9/2011 | Ozog | 700/291 |
| 2011/0257804 A1* | 10/2011 | Goel et al. | 700/291 |
| 2012/0029720 A1* | 2/2012 | Cherian et al. | 700/297 |
| 2012/0089268 A1* | 4/2012 | Torre et al. | 700/295 |
| 2012/0101639 A1 | 4/2012 | Carralero et al. | |
| 2012/0173252 A1 | 7/2012 | Mak et al. | |
| 2012/0283890 A1* | 11/2012 | Fu et al. | 700/295 |
| 2013/0024042 A1 | 1/2013 | Asghari et al. | |
| 2013/0041516 A1 | 2/2013 | Rockenfeller et al. | |
| 2013/0043725 A1 | 2/2013 | Birkelund | |
| 2013/0046415 A1 | 2/2013 | Curtis | |
| 2013/0076140 A1 | 3/2013 | Darden et al. | |
| 2013/0166084 A1* | 6/2013 | Sedighy et al. | 700/291 |
| 2013/0345884 A1* | 12/2013 | Forbes, Jr. | 700/286 |

OTHER PUBLICATIONS

Roscoe, A. J. et al., "Increasing Security of Supply by the use of a Local Power Controller During Large System Disturbances", IEEE PES International Conference and Exhibition, Dec. 6, 2011, pp. 1-7.

Alizadeh M. et al., "Information Infrastructure for Cellular Load Management in Green Power Delivery Systems", Oct. 17, 2011 IEEE, pp. 13-18.

Mizuno Y. et al., "Evaluation and Verification of an Intelligent Control System with Modeling of Green Energy Devices by Constructing a Micro-Grid System in University Campus (report 1)", Institute for Innovative Science and Technology, Nagasaki Institute for Applied Science, Nov. 11, 2012, 6 pages.

Bull, Christopher, "Forging the Smart Grid—From Theory to Practice", 2010, 11 pages.

Office Action in the Related DE application No. 1020132222793.0 dated Oct. 27, 2015, 10 pages.

* cited by examiner

CONFIGURING, OPTIMIZING AND MANAGING MICRO-GRIDS

FIELD OF THE INVENTION

The present invention generally relates to power distribution, and more particularly, to methods and systems for controlling electrical distribution grids.

BACKGROUND

Traditional electrical power networks include three systems: generation, transmission, and distribution. The distribution system (i.e., distribution grid or distribution network) receives power from one or more high-voltage sources of the transmission system and distributes that power to feeder lines. The main functions of the distribution grid include voltage transformation, voltage regulation and conservation, and switching and protection. Voltage transformation steps down power from the transmission voltage level to a distribution voltage level. Voltage regulation adjusts the voltage of the feeder lines as loads are added and removed. Switching and protection includes switches, circuit breakers, reclosers, and fuses that automatically or manually connect or disconnect portions of the distribution grid, which changes the grid's topology.

Technology has transformed distribution grids into decentralized systems that include a variety of power generation and storage components. For example, premises (e.g., a home or a business) within the distribution grid may operate their own energy resources (e.g., solar cells, wind turbines, and batteries) that can also provide power to the distribution grid. Further, smart energy devices (e.g., ZigBee® of ZigBee Alliance Corp., San Ramon, Calif.) allow utility operators to remotely control components of the distribution grid.

SUMMARY

In a first aspect of the invention, a method for configuring micro-grids implemented in a computer infrastructure includes determining premises in an electrical distribution grid that include an energy resource. The method further includes determining a configuration of the electrical distribution grid including a micro-grid, the micro-grid including the one or more premises. The method further includes electrically isolating the micro-grid from the electrical distribution grid.

In another aspect of the invention, a system for configuring a micro-grid including a computing system including computing devices communicatively linked to an electrical distribution grid via an information network is provided. The computing devices receive current condition information from devices in the electrical distribution grid via the information network. Further, the computing devices determine premises in the electrical distribution grid for inclusion in a micro-grid based on the current condition information. Further, the computing devices control switching elements in the electrical distribution grid to electrically isolate the premises from the electrical distribution grid.

In an additional aspect of the invention, a computer program product for configuring micro-grids is provided. The computer program product includes one or more computer-readable, tangible storage devices. Further, the computer program product includes program instructions, stored on at least one of the one or more storage devices, to electrically isolate one or more premises into a micro-grid within an electrical distribution grid. Further, the computer program product includes program instructions, stored on at least one of the one or more storage devices, to subscribe to devices in a home area network of the one or more premises. Further, the computer program product includes program instructions, stored on at least one of the one or more storage devices, to modify power flow in the micro-grid based on current condition information provided from the devices via the home area network.

In a further aspect of the invention, a computer system for configuring micro-grids in an electrical distribution grid is provided. The system includes one or more processors, one or more computer-readable memories, and one or more computer-readable, tangible storage devices. Further, the system includes program instructions, stored on at least one of the one or more storage devices for execution by at least one of the one or more processors via at least one of the one or more memories, to receive current condition information from a plurality of home area networks in premises of an electrical distribution grid. Further, the system includes program instructions, stored on at least one of the one or more storage devices for execution by at least one of the one or more processors via at least one of the one or more memories, to determine configuration information for the electrical distribution grid. The configuration information provides a topology of the electrical distribution grid including a micro-grid. The micro-grid is an electrically isolated portion of the electrical distribution grid that includes one or more of the premises. Further, the system includes program instructions, stored on at least one of the one or more storage devices for execution by at least one of the one or more processors via at least one of the one or more memories, to control switching elements in the electrical distribution grid based on the configuration information. Further, the system includes program instructions, stored on at least one of the one or more storage devices for execution by at least one of the one or more processors via at least one of the one or more memories, to exchange information with energy resources and energy consuming devices in one or more of the home area networks included in the micro-grid. Further, the system includes program instructions, stored on at least one of the one or more storage devices for execution by at least one of the one or more processors via at least one of the one or more memories, to control in power flow between the energy resources and the energy consuming devices.

In accordance with additional aspects of the present invention, a method of deploying a system for configuring micro-grids in an electrical distribution grid includes providing a computer infrastructure. The computer infrastructure subscribes to devices registered with a presence server corresponding to a micro-grid. Further, the computer infrastructure receives current condition information in real-time published in messages by the devices via the presence server. Further, the computer infrastructure determines whether total power generated within the micro-grid will exceed power demanded within the micro-grid. Further, the computer infrastructure transmits control messages to one or more of the devices via the presence server that cause the one or more devices to modify power provided or consumed by the one or more of the devices based on the determining.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
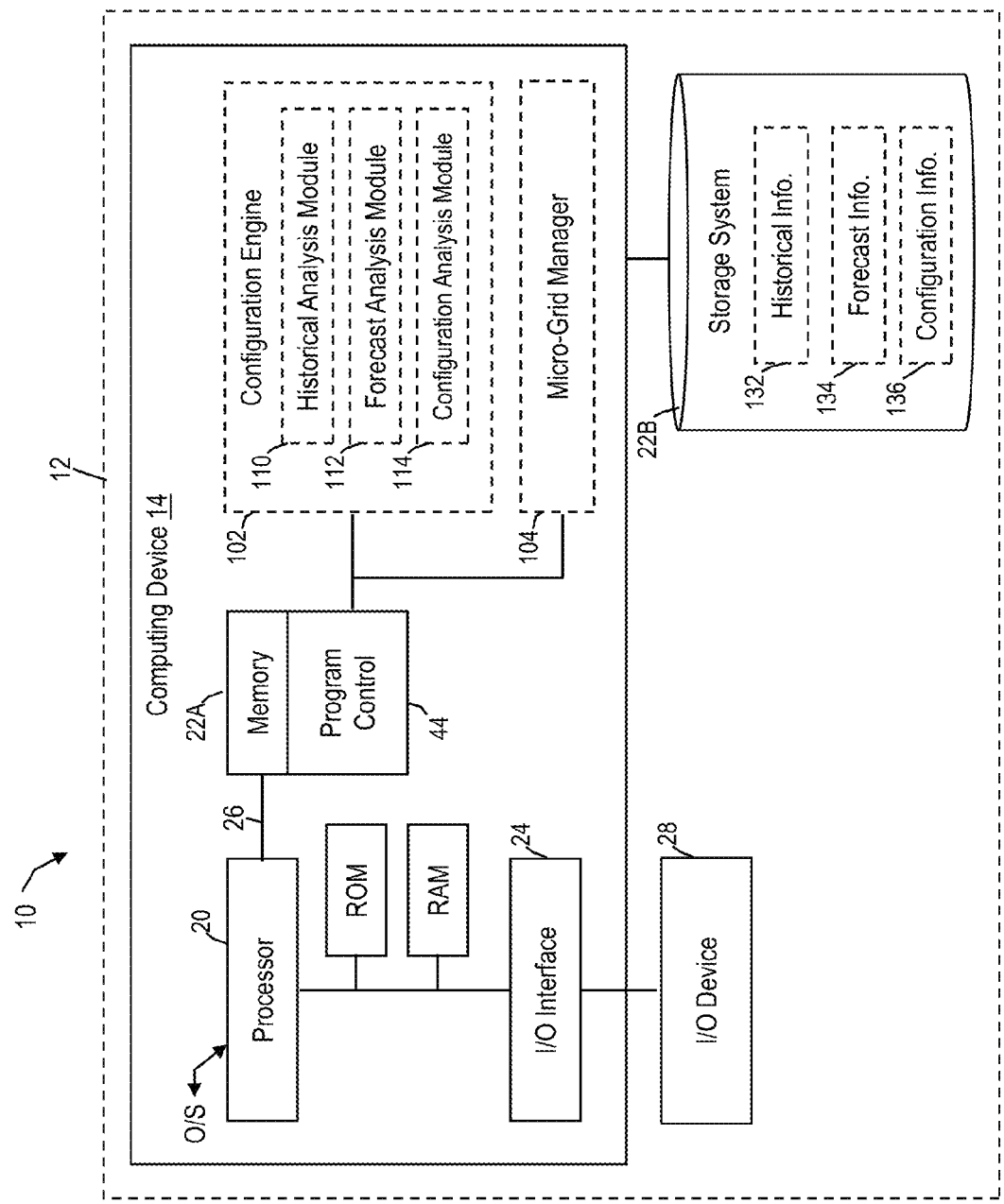
FIG. 1 shows an illustrative environment for implementing the steps in accordance with aspects of the invention.

The present invention generally relates to electrical power distribution, and more particularly, to methods and systems for controlling electrical power distribution networks (i.e., distribution grids). Implementations of the invention configure, manage, and monitor micro-grids. A micro-grid is a self-sufficient island that is electrically isolated (i.e., islanded) from the rest of a distribution grid and that includes sufficient energy resources to satisfy power demanded by consuming devices within the micro-grid. For example, an area of a distribution grid may include one or more premises (e.g., residences, offices, or facilities) including devices that consume electrical power (e.g., lights and appliances) and energy resources that provide electrical power (e.g., batteries, generators, solar cells, wind turbines, etc.). A micro-grid may include a subset of the premises that, in combination, produce sufficient power to meet the total power consumed within the subset of the premises. A utility operator may create the micro-grid by opening switching elements in the distribution grid that electrically isolate the premises within an area of the distribution grid from the remainder of the distribution grid.

In embodiments, a utility provider dynamically creates and/or reconfigures micro-grids to minimize the number of customers affected by an event that disrupts power delivery to portions of a distribution grid. Such events may include maintenance, construction, severe weather, natural disasters, man-made disasters, etc. For example, in response to a snowstorm that causes parts of the distribution grid to fail, the utility operator (e.g., a power provider, distributer, and/or manager) may remotely control switches (e.g., using supervisory control and data acquisition (SCADA) controllers) installed in the distribution grid to configure and establish one or more micro-grids. After the disruption ends (e.g., the damage has been repaired), the utility operator may reconfigure the distribution grid to dissolve the micro-grids without affecting the stability and reliability of the distribution grid.

Further, aspects of the invention manage micro-grids by dynamically controlling distributed energy resources and energy consumption devices at premises within the distribution grid (e.g., homes and business locations). For example, the disclosed systems and methods may monitor conditions within a micro-grid and, in response to changes in the conditions (e.g., changes in or supply or demand), and issue commands to remotely modify (i.e., tune) the operation of the devices within the micro-grid to generate or consume more or less power. By doing so, the utility operator enhances the reliability and robustness of the service provided to its customers. Additionally, the utility operator can maximize the use of local energy resources to satisfy the local energy demand, thereby reducing potential environmental negative impacts of power generation (e.g., soot from coal-fired power plants).

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein; for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, environment 10 includes a server or other computing system 12 that can perform the processes described herein. In particular, server 12 includes a computing device 14. Computing device 14 can be resident on a network infrastructure or computing device of a third party service provider (any of which is generally represented in FIG. 1).

Computing device 14 also includes a processor 20, memory 22A, an I/O interface 24, and a bus 26. Memory 22A can include local memory employed during actual execution of program code, bulk storage, and cache memories which provide temporary storage of at least some program code in order to reduce the number of times code must be retrieved from bulk storage during execution. In addition, computing device 14 includes random access memory (RAM), a read-only memory (ROM), and an operating system (O/S).

Computing device 14 is in communication with external I/O device/resource 28 and storage system 22B. For example, I/O device 28 can include any device that enables an individual to interact with computing device 14 (e.g., user interface) or any device that enables computing device 14 to communicate with one or more other computing devices using any type of communications link. External I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a configuration engine 102 and/or a micro-grid manager 104, e.g., the processes described herein. Configuration engine 102 and micro-grid manager 104 can be implemented as one or more program code in program control 44 stored in memory 22A as separate or combined modules. Additionally, configuration engine 102 and micro-grid manager 104 may be implemented as separate dedicated processors or a single or several processors to provide the function of these tools. Further, configuration engine 102 and micro-grid manager 104 (along with their respective data and modules) can be implemented in separate devices. Moreover, configuration engine 102 and micro-grid manager 104 (along with their respective data and modules) can be implemented in different planes of a network (e.g., a control plane and a service plane).

In accordance with aspects of the invention, server 12 includes configuration engine 102 and/or micro-grid manager 104. Configuration engine 102 is hardware, software, or a combination thereof that configures a micro-grid within a distribution grid by determining that demand by consuming devices within the micro-grid is satisfied by the energy resources within that micro-grid. Energy consuming devices include, for example, home appliances, lighting, electric vehicles, etc. The energy resources include variable energy resources (VERs) and distributed energy resources (DERs), including, e.g., generators (e.g., gas, wind, solar, etc.) and energy storage devices (e.g., electric batteries, fuel cells, etc.).

After determining a micro-grid configuration, configuration engine 102 issues messages to control elements of the distribution grid (e.g., switches connected to SCADA controllers) to modify the topology of the electrical distribution network and create or modify the micro-grid. For example, the configuration engine may dynamically modify a micro-grid by reducing the number of connected premises and/or consuming devices within the micro-grid based on current conditions (e.g., weather, load, power generation, etc.) within the distribution grid.

Still referring to FIG. 1, in accordance with aspects of the invention, the configuration engine 102 includes a historical analysis module 110, a forecast analysis module 112, and/or a configuration analysis module 114. Historical analysis module 110 is hardware, software, or a combination thereof that analyzes historical information, such as historical information 132 in storage system 22B. Historical information 132 may be collected from devices of the distribution grid and/or third-party sources. Historical information 132 includes, for example, past weather conditions (e.g., temperature, precipitation, wind directions and forces, barometric pressure, and sky conditions), electrical conditions (e.g., voltage, current, real, reactive, and apparent power), network topology, power outage information, communications' infrastructure information (e.g., operating status, location, clients), and asset information (e.g., identification, host network, location). Historical analysis module 110 aggregates, correlates, filters, and/or enriches historical information 132 using conventional data analysis techniques. For example, historical analysis module 110 may average power demand data at different locations (e.g., premises) over a time period to generate a digest of historical information 132 that associates locations of a distribution grid (including micro-grids) with power demand at different time frames (e.g., monthly, daily, hourly, etc.).

Forecast analysis module 112 is hardware, software, or a combination thereof that combines historical information (e.g., the digest of historical information determined by historical analysis module 110) and forecast information, such as forecast information 134 in storage system 22B, to determine forecasted near-term conditions in the electrical network. Forecast information 134 may be information generated by the utility operator and/or obtained from third-party sources. For example, forecast information 134 includes weather forecast information, local forecast information, and power generation forecast information (including wind, solar, temperature, etc.). Forecast analysis module 112 may analyze forecast information 134 using one or more predefined models to forecast near-term conditions of the distribution grid. For example, based on energy consumption profiles and energy generation profiles, forecast analysis module 112 generates a data structure that associates locations (e.g., premises) of an electrical grid (including micro-grids) with predicted power demand at different times in the near-future (e.g., days, hours, minutes, etc.). The generated forecast may be continually and/or periodically updated (e.g., in real-time).

Configuration analysis module 114 is hardware, software or a combination thereof that determines network topology, including micro-grid configurations, based on historical information, forecast information and/or the current state of the distribution grid. In embodiments, based on the forecasted near-term conditions determined by forecast analysis module 112, configuration analysis module 114 determines configuration information 136, which defines locations (e.g., premises) that can be electrically isolated into one or more micro-grids that include energy resources (e.g., distributed and/or variable energy resources, such as wind turbines) that can generate a greater amount of power than consumed by energy consuming devices (e.g., appliances) operating within the micro-grid. Configuration analysis module 114 may analyze the near-term forecast information and/or the current state information using conventional techniques. For, example, configuration analysis module 114 may analyze the information using data event and data pattern matching, graphs exploration, Monte-Carlo simulation, stochastic and Las Vegas algorithms, approximation and genetics heuristics using rules-based or model-based datasets, to aggregate, correlate and analyze the above real-time and historical information sources to define the optimal network configuration for micro-grids. An optimal configuration for a micro-grid may include a mix of energy resources and energy consuming devices that maximize the number of customers in one or more micro-grids.

In accordance with aspects of the invention, micro-grid manager 104 is hardware, software, or a combination thereof that implements and manages micro-grids. In embodiments, micro-grid manager 104 obtains configuration information 136 generated by configuration engine 102 and, based on that information, issues commands to devices within the distribution grid to open switches that isolate one or more portions into a micro-grid. Further, in embodiments, micro-grid manager 104 manages micro-grids by ensuring that demand by power consumers within a particular micro-grid is satisfied by the power providers within that micro-grid. In implementations, using analysis techniques similar to configuration engine 102, micro-grid manager 104 may combine current (e.g., real-time) information received from devices and/or systems in a micro-grid with historical information and forecast information to dynamically tune the performance of energy resources and power consumers within the micro-grid. For example, based on current temperature information received from one or more devices in the distribution grid, micro-grid manager 104 may communicate with smart appliances (e.g., water heater and air conditioner) in a home area network of premises in the micro-grid and control them to reduce their power consumption. By doing so, micro-grid manager 104 may ensure that sufficient energy is produced in the micro-grid to power devices that may operate within the micro-gird.

Although micro-grid manager 104 is shown in FIG. 1 as being incorporated in server 12 along with configuration engine 102, micro-grid manager 104 can be implemented on a separate server or other computing device. For example, configuration engine 102 can be part of a utility operator's centralized distribution and/or control infrastructure of a distribution grid, and micro-grid manager 104 can be part of a service plane that communicates with devices (e.g., a presence server) in a control that services devices in a user/transport plane.

In embodiments, configuration engine 102 and micro-grid manager 104 operate in real-time. In the context of this disclosure, "real-time" is processing received information at a rate that is approximately the same or faster than the rate at which the system receives information from one or more devices operating in the system. For example, if a real-time system receives information at a frequency of 1 Hertz, the system outputs information at approximately 1 Hertz or faster under normal operating conditions.

While executing the computer program code, processor 20 can read and/or write data to/from memory 22A, storage system 22B, and/or I/O interface 24. The program code executes the processes of the invention. Bus 26 provides a communications link between each of the components in computing device 14.

Computing device 14 can include any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure is only illustrative of various types of computer infrastructures for implementing the invention. For example, in embodiments, server 12 includes two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can include any combination of wired and/or wireless links; any combination of one or more types of networks (e.g., the Internet, a wide area network, a local area network, a virtual private network, etc.); and/or utilize any combination of transmission techniques and protocols.

Figure 2:
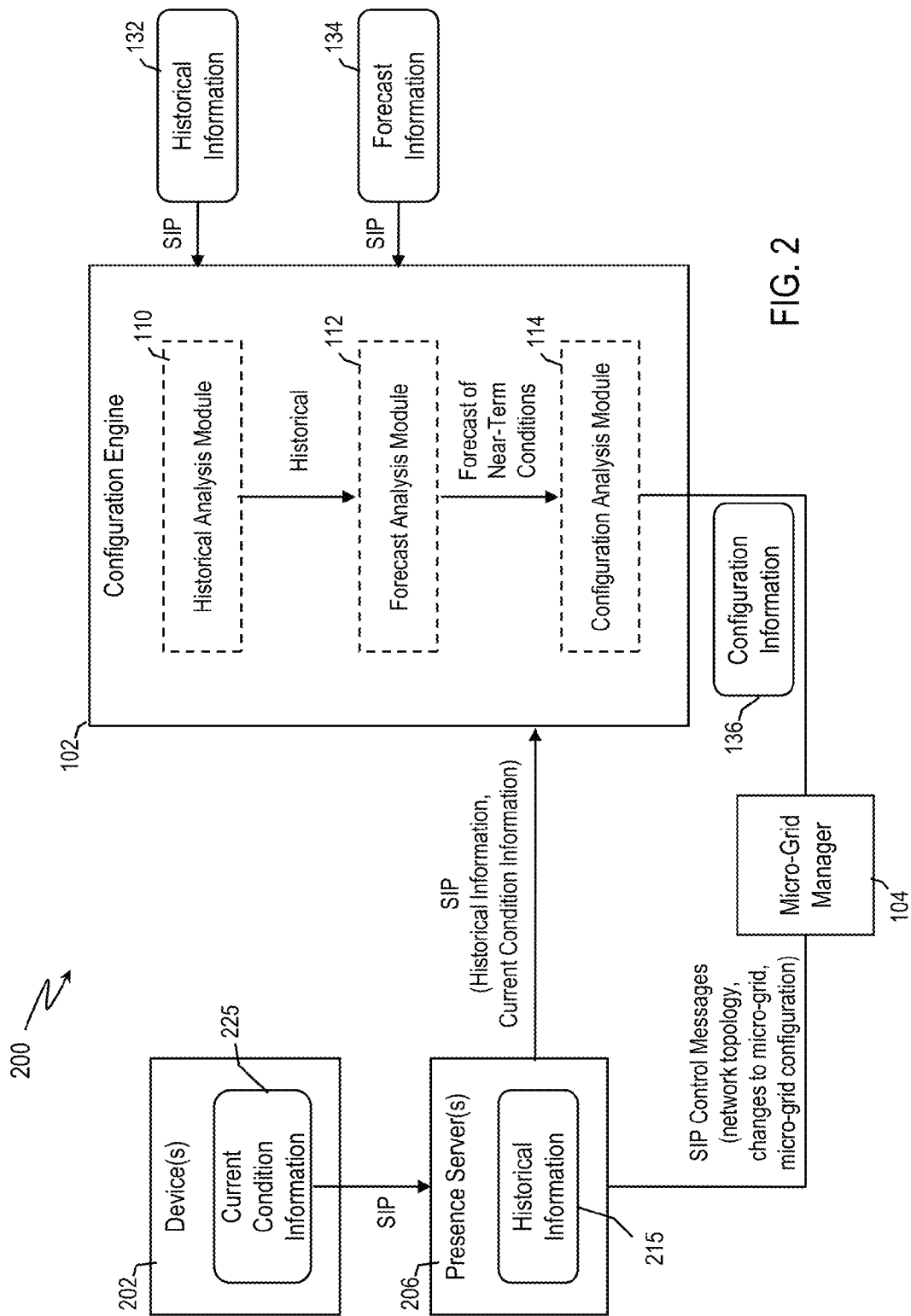
FIG. 2 shows a functional block diagram of an environment for configuring micro-grids in accordance with aspects of the invention.

FIG. 2 shows a functional block diagram of an exemplary environment 200 for configuring micro-grids in accordance with aspects of the invention. Environment 200 includes one or more devices 202, one or more presence servers 206, configuration engine 102, and micro-grid manager 104. Devices 202 may be energy resources (e.g., a power generator or power storage) and/or energy consuming devices (e.g., powered appliances) within a distribution grid. According to further aspects, devices 202 are home-area network-enabled devices (e.g., smart devices) that include network communications interfaces through which the devices may exchange information and/or receive commands using, e.g., SIP or MQTT protocol messaging. For example, as shown in FIG. 2, devices 202 may communicate via presence servers 206 to provide current condition information 225 (e.g., on/off state, power, voltage, current, faults, service information, etc.) to configuration engine 102 (which may be relayed through micro-grid manager 104). Additionally, devices 202 may receive commands (e.g. SIP control messages) from e.g., micro-grid manager 104 that control devices 202 to modify their operation (e.g., power consumption or/or power generation).

Presence server 206 is software, a system, or combination thereof that accepts, stores and distributes SIP presence information from SIP entities. For example, presence server 206 is a SIP presence server that registers micro-grid manager 104 (e.g., as a watcher application) and devices 202 (e.g., as presentities). As such, the SIP entities illustrated in FIG. 2 can subscribe, publish, and acknowledge information or commands via SIP messages.

According to aspects of the invention, configuration engine 102 determines micro-grids based on historical information 132, forecast information 134, and/or current condition information 225. Current condition information 225 is information received from one or more devices in the electrical grid (e.g., device 202) that describes the current state of the network. Current condition information 225 includes, for example, information such loads, topology information (e.g., identity, host network, location, tie-line), weather, state (on/off, power, voltage, current, impedance, temperature), and network communication status. In embodiments, configuration analysis module 114 determines an optimal micro-grid configuration based on information determined by historical analysis module 110 and forecast analysis module 112. Historical analysis module 110 analyzes historical information 132 to determine a digest of historical information. Forecast analysis module 112 analyzes forecast information 134 and/or the output of the historical analysis module to determine a forecast of near-term conditions in the distribution grid (e.g., devices and their respective power supply and/or demand). Using the forecast of near-term conditions determined by forecast analysis module 112, configuration analysis module 114 determines potential micro-grids.

Still referring to FIG. 2, in accordance with aspects of the invention, micro-grid manager 104 issues SIP control messages based on the configuration information (e.g., configuration information 136) determined by configuration engine 102. The SIP control messages can include information such as network topology changes, changes to the micro-grid configuration, and/or changes to power generations and/or consumption parameters of devices in the micro-grid. For example, after configuration information 136 is determined, the utility operator may review the information and initiate the configuration changes in the distribution grid. Upon initiation, micro-grid manager 104 receives configuration information 136 (e.g., from configuration engine 102 or storage device 22B) and issues commands to the distribution grid to create or modify one or more micro-grids. In embodiments, micro-grid manager 104 transmits SIP control messages (e.g., via presence server 206) that control topology elements (e.g., as switches, fuses and sectionalizers connected to SCADA controllers) to isolate some or all devices 202 into a micro-grid.

Notably, FIG. 2 illustrates an embodiment in which micro-grid manager 104 uses SIP messages to exchange information with devices 202 and presence server 206. However, embodiments of the invention are not limited to this example. As discussed in greater detail below, embodiments may instead use MQTT-messaging or any other suitable communication protocol. Further, as noted above, configuration engine 102 and micro-grid manager 104 may be incorporated in a single system.

Figure 3:
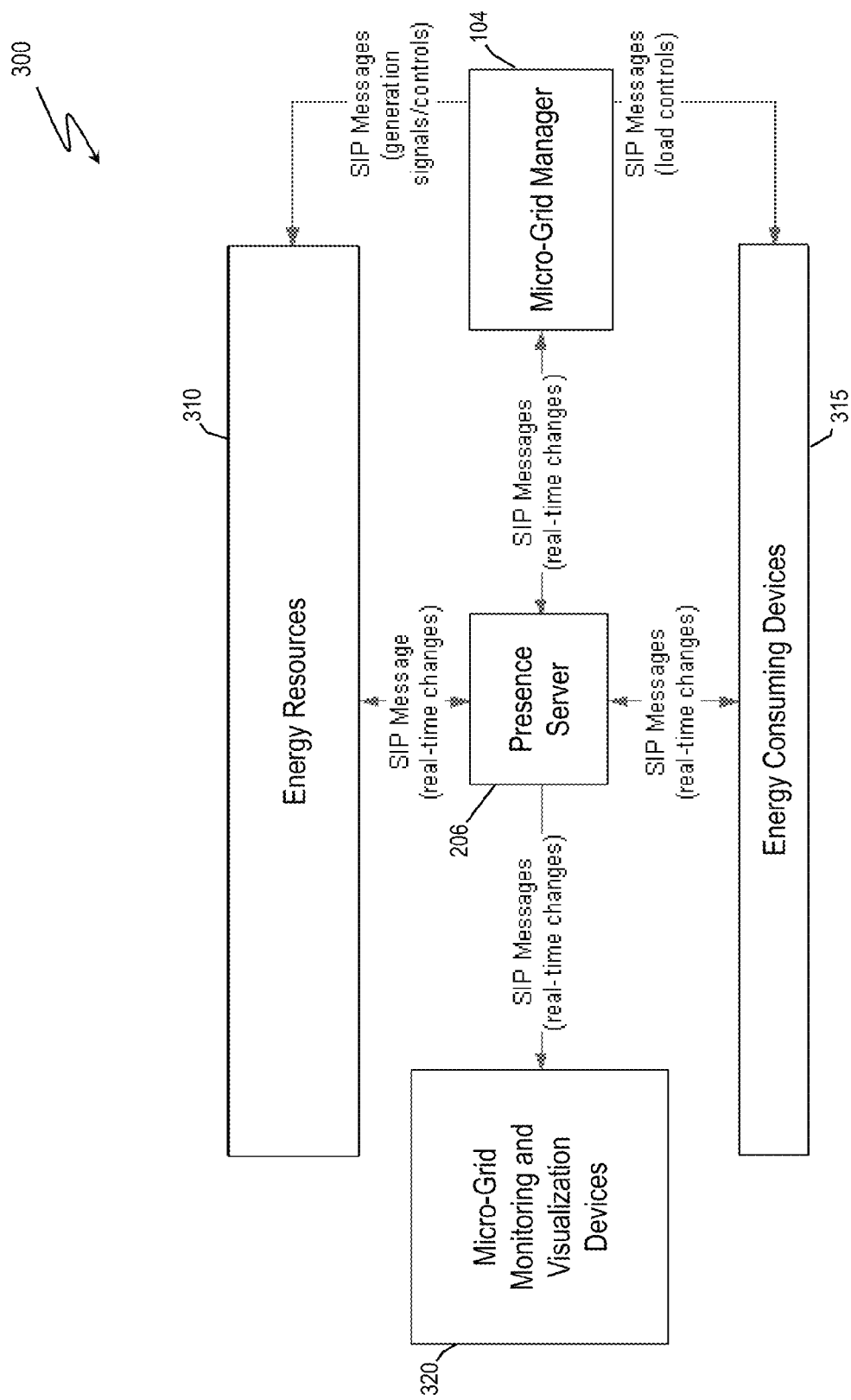
FIG. 3 shows a functional block diagram of an exemplary environment for managing a micro-grid using Session Initiation Protocol (SIP) in accordance with aspects of the invention.

FIG. 3 is a functional block diagram illustrating an exemplary environment 300 for managing a micro-grid using SIP messaging in accordance with aspects of the invention. As shown, micro-grid manager 104 can be communicatively linked with components of exemplary environment 300, including energy resources 310, energy consuming devices 315, micro-grid monitoring and visualization devices 320, and a presence server 206. Energy resources 310 are systems and devices that provide power to the micro-grid, including electric vehicles (e.g., a plug-in electric vehicle or a plug-in hybrid electric vehicle), variable energy resources (e.g., solar cells, wind turbines), and energy storage devices (e.g., batteries, storage capacitors, and fuel cells). Energy consuming devices 315 are devices that consume energy (e.g., home appliances, water heaters, swimming pools, programmable controllable thermostats, etc.).

In accordance with aspects of the invention, energy resources 310 and energy consuming devices 315 are network-enabled devices that can form a home-area-network in which the clients (e.g., energy resources 310 and energy consuming devices 315) use SIP messaging. For example, home area network-enabled energy resources 310 and energy consuming devices 315 devices can register with presence server 206 (e.g., using direct SIP registration with a SIP registrar or using a Zigbee® interface).

Micro-grid manager 104 communicates with energy resources 310, energy consuming devices 315, micro-grid monitoring and visualization devices 320, and presence server 206 using SIP messaging. The SIP messages may be communicated over an information network, such as a wide area network or the Internet, using, e.g., HTTP or HTTPS. Additionally, the SIP messages can be encrypted using secured SIP and IPSec. Micro-grid manager 104 registers with a SIP registrar (e.g., presence server 206) and subscribes to SIP notifications and messages issued by the various connected home area network devices that belong to the micro-grid. By doing so, micro-grid manager 104 functions as a SIP watcher of energy resources 310, energy consuming devices 315, and/or micro-grid monitoring and visualization devices 320.

Micro-grid manager 104 monitors and controls devices in the micro-grid to ensure that energy resources 310 assigned to the micro-grid provide sufficient power to supply energy consuming devices 315 that are also within the micro-grid. For example, based on the topology of the micro-grid and current conditions (e.g., current conditions information 225) received in SIP messages issued by the devices in a micro-grid (such as devices 202), micro-grid manager 104 calculates the current conditions of the monitored micro-grid (e.g., the actual or estimated reactive and actual power, voltage, current, etc.). That is, micro-grid manager 104 determines the power flow of the micro-grid based on the current (e.g., real-time) information provided by energy resources 310 and energy consuming devices 315.

Based on the current conditions, micro-grid manager 104 can modify the energy production of energy resources 310 (increased output) and/or reduce the energy consumption of energy consuming devices 315 (e.g., decrease the output or shut off appliances, such as air conditioners) to balance the supply and demand of the micro-grid. In the event the supply or demand of the micro-grid cannot be balanced such that the micro-grid is self-sufficient, the micro-grid manager may initiate a change in the micro-grid's configuration by configuration engine 102 (shown in FIG. 1).

Micro-grid monitoring and visualization devices 320 are software, hardware, or combination thereof that gather and present information from one or more of micro-grid manager 104, energy resources 310, energy consuming devices 315 and presence server 206. For example, via micro-grid monitoring and visualization devices 320, an employee of the utility operator (e.g., a distribution dispatcher) may use a centralized advanced monitoring visualization application to view the state of all or set of micro-grids that it managed by one or more micro-grid managers. Further, the utility operator and/or its customers can ascertain the current state of micro-grids through advanced visualization watcher applications, which improves the situational awareness of customers and utility operator.

Figure 4:
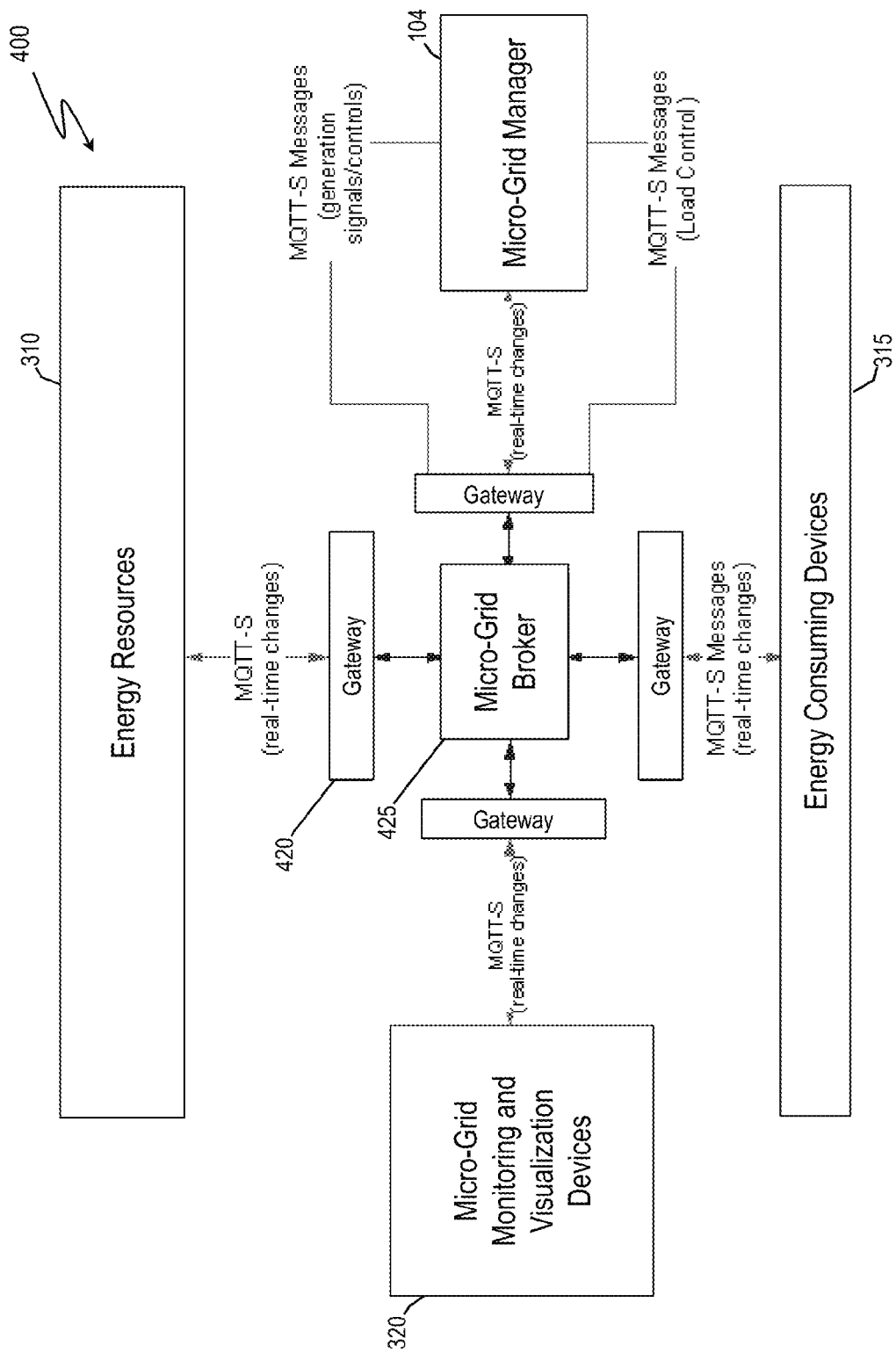
FIG. 4 shows a functional block diagram of an exemplary environment for managing a micro-grid using Message Queue Telemetry Transport (MQTT) protocol in accordance with aspects of the invention.

FIG. 4 is a functional block diagram illustrating a system in accordance with aspects of the invention that uses MQTTs and/or MQTT messaging to manage micro-grids in an electrical network. The exemplary embodiment depicted in FIG. 4 includes a micro-grid manager 104 communicatively linked with components of the exemplary environment 400, including energy resources 310, energy consuming devices 315, micro-grid monitoring and visualization devices 320, gateways 420, and micro-grid broker 425. Energy resources 310, energy consuming devices 315, and micro-grid and monitoring and visualization devices 320 are the same or similar to those described above with respect to FIG. 3. In the present implementation, the use of MQTT messaging for wireless communication improves the reliably with respect to a wireless network using SIP.

As shown in FIG. 4, each element in environment 400 may act as a publisher of the information or subscriber of information. Gateways 420 perform protocol transformation by stripping header elements from MQTT messages or adding header elements for MQTTs. Micro-grid broker 425 exchanges messages between clients (i.e., micro-grid manager 104, energy resources 310, energy consuming devices 315, and micro-grid monitoring and visualization devices 320) to send MQTTs message and for subscribers to receive. Thus, micro-grid broker 425 can store the received and routed messages based on one of a flag of transported messages that specifies the data retention requirement of the message, even once the message is delivered to desired clients.

Figure 5:
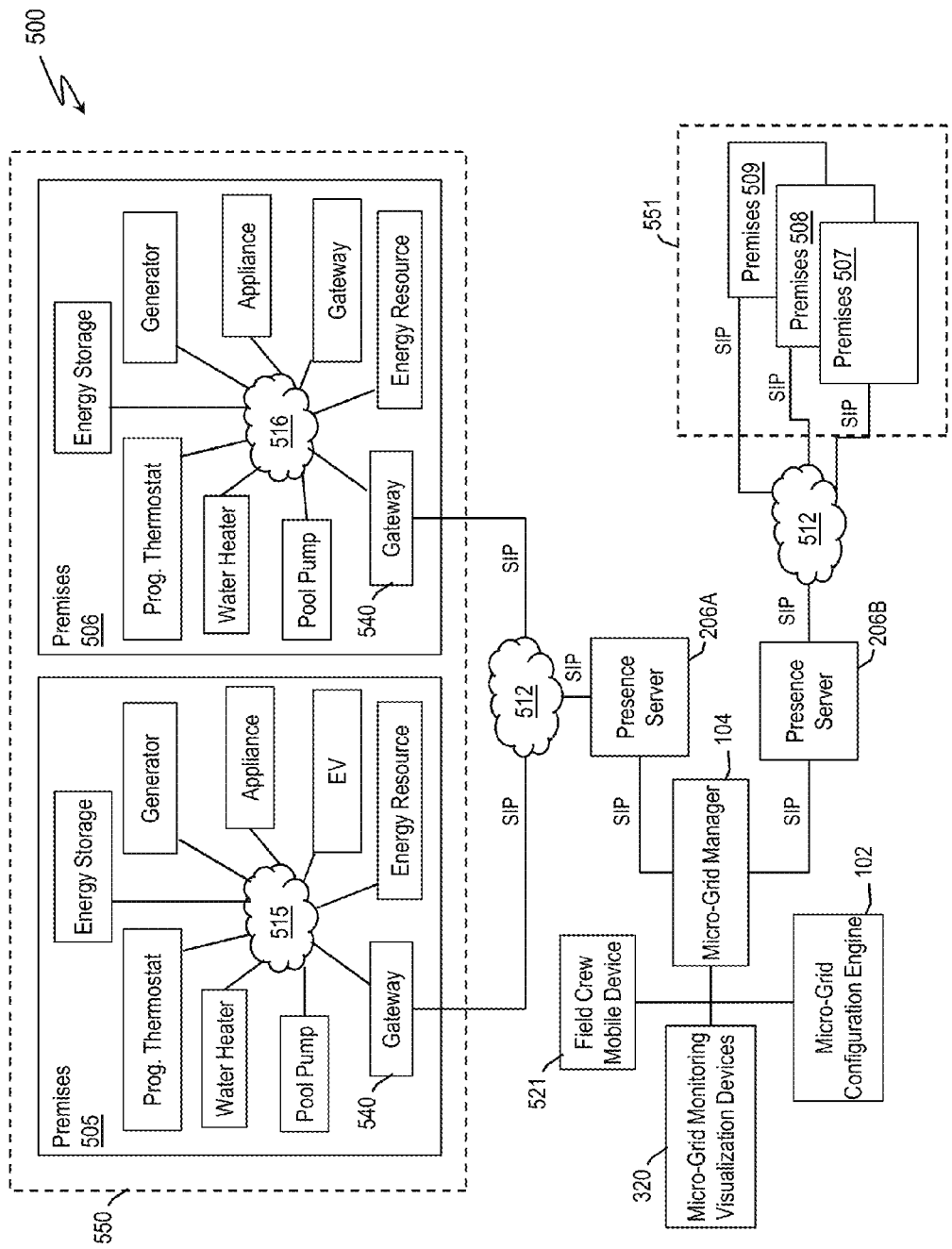
FIG. 5 shows a functional block diagram of an exemplary environment for managing micro-grids using SIP in accordance with aspects of the invention.

FIG. 5 shows an environment 500 for managing micro-grids using SIP in accordance with aspects of the invention. Environment 500 includes one or more premises 505-509 having home area networks, as illustrated by home area networks 515 and 516 of premises 505 and 506, communicatively linked through one or more networks 512 (e.g., a cellular radio network, a pole-switched telephone network (PSTN) and/or the Internet) to configuration engine 102, micro-grid manager 104, micro-grid monitoring and visualization devices 320, and presence servers 206A and 206B. Each of premises 505-509 may include one or more devices (e.g., similar to device 202), which may be energy resources 310 and/or energy consuming devices 315) communicatively linked in their respective home area networks (e.g., home area networks 515 and 516), such as shown in FIG. 3. For example, as shown in FIG. 5, premises 505 and 506 include the following devices that can be managed in implementation accordance with aspects of the invention: a water heater, a controllable thermostat, energy storage (e.g. batteries, capacitive storage), a gas generator (or the like), a pool pump, home appliances (e.g., television, digital video disc player, refrigerator, etc.), a plug-in electric vehicle, and a variable energy resource (e.g., wind turbine, solar power cells). In implementations, home area networks 515 and 516 are Zigbee® networks that connect to network 512 via respective gateways 540, which translate between the SIP protocol and the communication protocol of network 512 (e.g., TCP/IP).

Premises 505 and premises 506 are isolated within a first micro-grid 550 and premises 507-509 are isolated in a second micro-grid 551 (as exemplified by the dashed-line surrounding these premises). Micro-grid manager 104 functions as a SIP watcher of presence servers 206A and 206B. That is, micro-grid manager 104 registers with presence servers 206A and/or 206B (e.g., with a subscription registrar) and subscribes to SIP notifications issued by the various devices in the home area networks of premises 505-509, respectively, from which it receives condition information about the state of micro-grids 550 and 551 (e.g., current condition information 225). Based on the obtained condition information, historical information (e.g., historical information 132) and forecast information (e.g., forecast information 134), micro-grid manager 104 determines power control settings for the devices in home area networks 515 and 516 of premises 505-509 to ensure the stability and reliability of micro-grids 550 and 551. Further, micro-grid manager 104 issues SIP control messages to the devices via, e.g., gateway 540, and modifies the power control setting of the devices (e.g., increases/decreases power generation or consumption).

While FIG. 5 includes only one micro-grid manager 104, implementations of the present invention may include numerous micro-grid managers. In such implementations, configuration engine 102 enables/disables the micro-grid managers by providing the configuration of the micro-grid to manage along with the list of premises belonging to each micro-grid, etc. Premises belonging to a micro-grid may or may not register with the same presence server. In the latter instance, the micro-grid manager registers with several presence servers and subscribes to SIP notifications issued by the various home area network devices. Based on the current electrical state of its micro-grids, the micro-grid manager issues SIP control messages to home area network devices, via the proper presence server, to manage balance demand and generation within the micro-grid.

Micro-grid monitoring and visualization devices 320 can request information from one or several micro-grid managers 104. For example, micro-grid monitoring and visualization devices 320 may be a centralized system that presents information from micro-grid monitoring and visualization devices 320 related to the state of micro-grids in an area of responsibility of a distribution dispatcher. Field crew mobile device 521 may be a mobile device used by a field crew working in a particular micro-grid that obtains information from micro-grid monitoring and visualization devices 320 to display the current state of the micro-grid. Further, field crew mobile device 521 may use SIP or other communication protocol through a private or public and secured wireless network, to send specific command controls to the distribution grid through micro-grid manager 104 to e.g., open fuses, ramp down a distributed energy resource, reconnect a consuming device, etc.

In an implementation, micro-grid manager 104 communicates with gateways 540, instead of communicating directly to the devices of premises 505-509. In this embodiment, gateway 540 operates as a premises energy management system. For example, gateway 540 may interpret and dispatch control messages issued by micro-grid manager 102 to the devices in home area networks 515 and 516.

Figure 6:
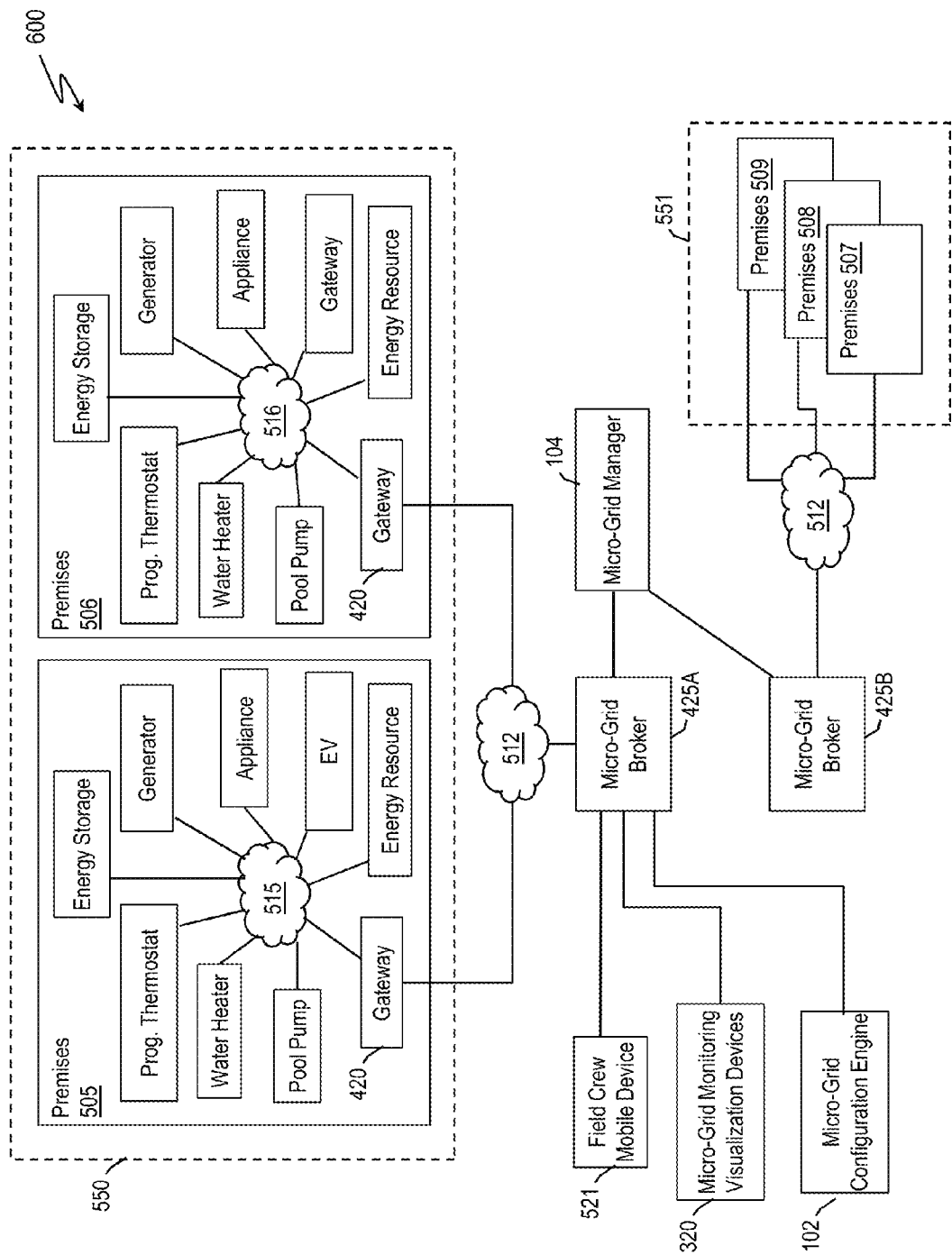
FIG. 6 shows a functional block diagram of an exemplary environment for managing micro-grids using MQTT protocol in accordance with aspects of the invention.

FIG. 6 shows an environment 600 for managing micro-grids using MQTTs and/or MQTT messaging in accordance with aspects of the invention. The communication flow of the implementation shown in FIG. 6 is similar to that shown in FIG. 5, but instead communicating is provided using MQTTs and/or MQTT protocols through micro-grid brokers 425A and 425B. That is, similar to environment 500, the exemplary embodiment depicted in FIG. 6 includes one or more premises 505-509 having home area networks (e.g., home area networks 515 and 516 of premises 505 and 506) communicatively linked through one or more networks 512 (e.g., a TCP/IP network) to a configuration engine 102, micro-grid manager 104, micro-grid monitoring and visualization devices 320, and field crew mobile device 521.

In accordance with the present implementations, home area networks 515 and 516 are Zigbee® networks that connect to network 512 via respective gateways 420. The clients (e.g., devices) of home area networks 515 and 516 can have a MQTTs client (e.g., Zigbee®) deployed on top of home area networks 515 and 516. Further, similar to that described above with respect to FIG. 4, micro-grid brokers 425A and 425B use MQTTs and/or MQTT messaging to communicate with the devices in micro-grids 550 and 551. Each device in home area networks 515 and 516 may act as either a publisher of the information or subscriber of information.

As shown in FIG. 6, and similar to that illustrated in FIG. 4, home area networks 515 and 516 communicate with network 512 via gateways 420. The use of MQTT for wireless devices can increase reliability with respect to SIP messaging. Gateways 420 translate MQTTs to MQTT messages between the devices in home area networks 515 and 516 and micro-grid brokers 425A and 425B. In embodiments, gateways 420 perform protocol transformation by stripping header elements from MQTT or adding header elements for MQTTs.

Figure 7:
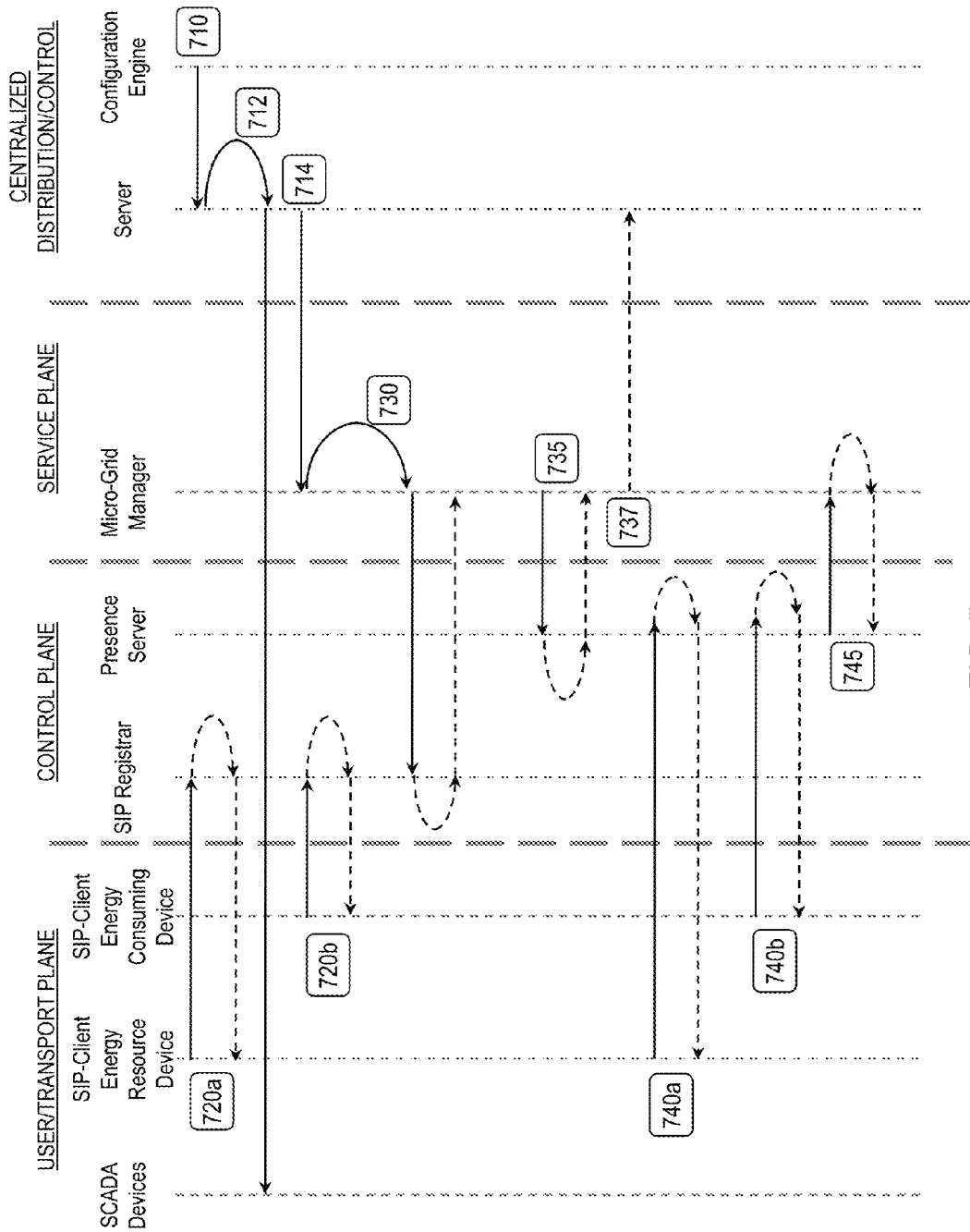
FIG. 7 shows a flow diagram of an exemplary process for configuring a micro-grid in accordance with aspects of the present invention.
Figure 8:
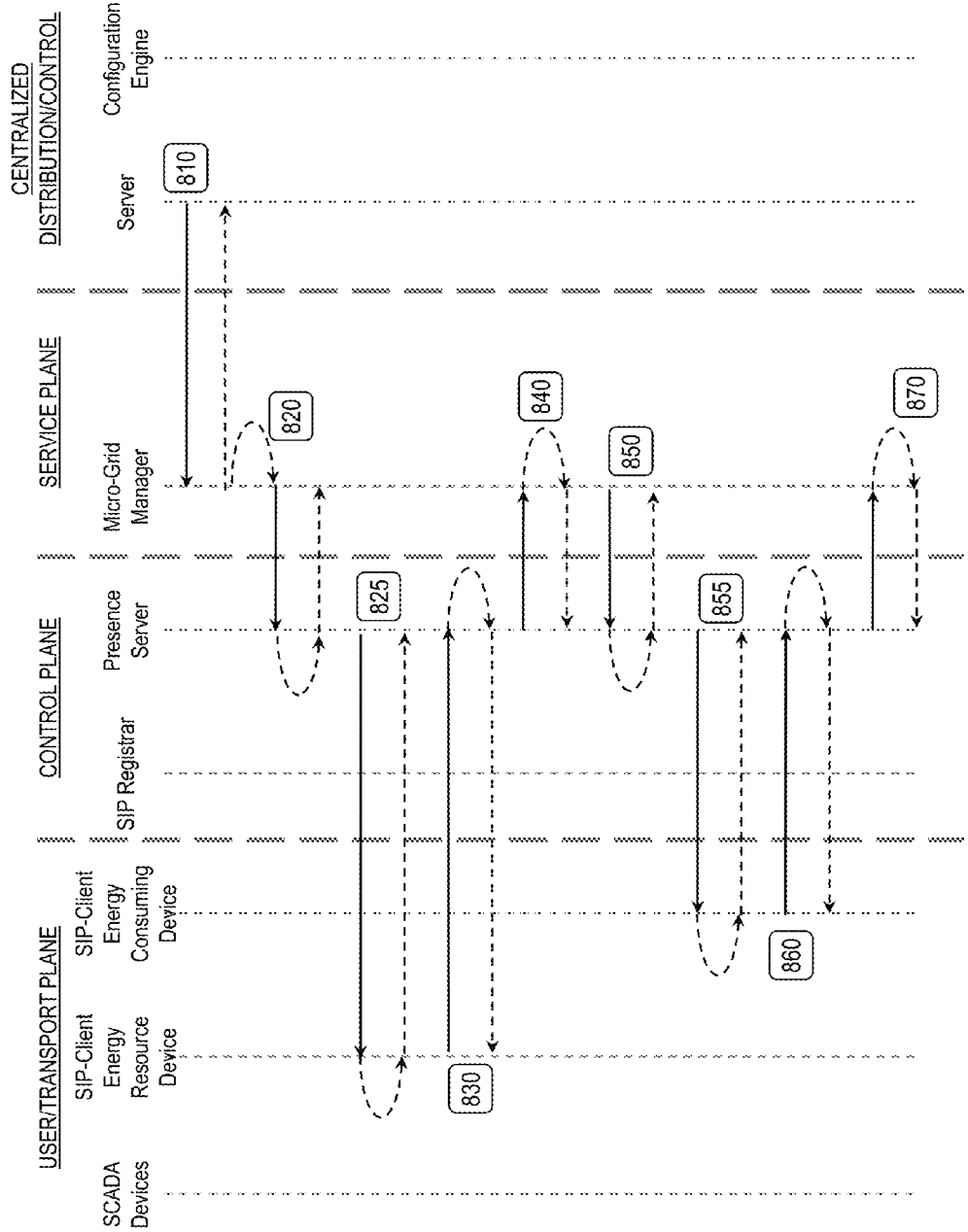
FIG. 8 shows a flow diagram of an exemplary process for managing a micro-grid in accordance with aspects of the present invention.

FIGS. 7 and 8 show exemplary swim-lane diagrams for performing aspects of the present invention. The steps of FIGS. 7 and 8 can be implemented in any of the environments of FIGS. 1-6, for example.

The flowcharts in FIGS. 7 and 8 illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disc-read/write (CD-R/W) and DVD.

FIG. 7 shows a swim-lane diagram of an exemplary process for configuring a micro-grid in accordance with aspects of the present invention. The flow includes a user/transport plane, a control plane, a service plane, and a centralized distribution control plane. The user/transport plane includes SCADA devices, SIP-client energy resources devices (e.g., energy resources 310), and SIP-client energy consuming devices (e.g., energy consuming devices 315). The control plane includes a SIP registrar and a presence server (e.g., presence server 206). The service plane may include a micro-grid manager (e.g., micro-grid manager 104). The centralized distribution control plane may include a server (e.g., server 12) and a configuration engine (e.g., configuration engine 102).

The process starts upon initiation of a configuration engine (e.g., configuration engine 102). The configuration engine may be initiated manually by an operator or automatically based on current conditions of a distribution grid (e.g., a failure detected during a storm). At step 710, the configuration engine determines an optimal configuration (e.g., configuration information 136) for micro-grids (e.g., micro-grids 550 and 551) in the distribution grid based on the current (e.g., real-time) conditions of the distribution grid, as well as historical information (e.g., historical information 132) and forecast information (e.g., forecast information 134). For example, the configuration engine may determine a configuration of a micro-grid (e.g., micro-grid 550) based on information received from network-enabled devices in distribution grid (e.g., device 202), historical weather patterns (e.g., daily high/low temperatures), and forecasted power consumption. At step 712, the determined configuration information may be recorded by a central server (e.g., server 12) in data storage system (e.g., storage system 22B) for future reference and access (e.g., by micro-grid manager 102).

At step 714, a micro-grid manager (e.g., micro-grid manager 104) receives the configuration information determined by the configuration engine. The micro-grid manager defines the switching plans to isolate the determined micro-grid configuration. For example, based on data in the configuration information describing the location of the micro-grid and topology information of the distribution grid, the micro-grid manager may identify switches, reclosures and the like in the distribution grid that will isolate the micro-grid. The micro-grid manager can automatically or manually execute the switching plan for the micro-grid configuration by sending controls to switching elements of the distribution grid to isolate a portion of the distribution grid into a micro-grid. For example, the micro-grid manager can send commands (e.g., using SIP control messages) to remotely controllable SCADA devices that open selected switches in the distribution grid and thereby isolate a portion of the distribution grid into a micro-grid. In embodiments, prior to sending the commands to create the micro-grid, the management engine validates the switching plan by verifying each micro-grid will be viable once disconnected from the rest of distribution grid.

At steps 720a and 720b, the various devices (e.g., distributed energy resources 310 and energy consuming devices 315) in the home area networks (e.g., home area networks 515 and 516) register with a SIP registrar (e.g., presence server 206), which enables them to participate in a micro-grid. Steps 720a and/or 720b may occur in before, after, or contemporaneously with one or more of steps 710, 712, and 714. Notably, the dashed lines in the figures represent acknowledgement messages (e.g. SIP acknowledgment messages).

At step 730, based on a micro-grid configuration (e.g., configuration information 136) provided from the configuration engine, the micro-grid manager identifies one or more presence servers to register with and sends a SIP registration message to the SIP registrars of those presence servers. For example, the micro-manager may identify the presence servers based on configuration information that includes topology information indicating the presence servers corresponding to devices and or premises (e.g., premises 505-509) that are to be assigned to a micro-grid. At step 735, once registered, the micro-grid manager subscribes to all the devices in the home area network that belong in the micro-grid assigned to the named micro-grid manager. Once the subscriptions are sent out and acknowledged by the presence server(s), at step 737, the micro-grid manager acknowledges the reception of micro-grids configuration, informing the utility operator (e.g., centralized distribution/control) that the micro-grid manager can, as need be, take ownership of monitoring and controlling assigned micro-grids.

At steps 740a and 740b, each device registered to the presence server and participating to the micro-grid subscribes to the SIP control messages issued by micro-grid manager and publishes their current state (e.g., current condition information 225). For example, the devices may issue periodic condition information and/or they may issue a notification when a change in state occurs. At step 745, the presence server acknowledges the SIP messages issued by the devices and notifies the micro-grid manager. This enables the micro-grid manager to determine the current state of monitored micro-grids. For example, on a periodic basis, or when certain thresholds or a switching device has changed status, the micro-grid manager recalculates the electrical state of monitored micro-grid(s).

FIG. 8 illustrates a swim-lane diagram of an exemplary process for monitoring a micro-grid in accordance with aspects of the invention. The flow includes a user/transport plane, a control plane, a service plane, and a centralized distribution control plane. The user/transport plane includes SCADA devices, SIP-client energy resources devices (e.g., energy resources 310), and SIP-client energy consuming devices (e.g., energy consuming devices 315). The control plane includes a SIP registrar and a presence server (e.g., presence server 206). The service plane may include a micro-grid manager (e.g., micro-grid manager 104). The centralized distribution control plane may include a server (e.g., server 12) and a configuration engine (e.g., configuration engine 102).

The process shown in FIG. 8 may occur, for example, after the micro-grid configuration process shown in FIG. 7. For example, during a large power outage in the distribution grid, a central server of the utility operator (e.g., server 12) can enable the management of an existing micro-grid (e.g., micro-grid 550) by a micro-grid manager (e.g., micro-grid manager 104). At step 810, the micro-grid manager acknowledges reception of the configuration information for the micro-grid and initiates control of the various devices (e.g., devices 202) in the micro-grid.

At step 820, if micro-grid manager detects that the total power generated (e.g., by energy resources 310) in the micro-grid is not sufficient to support the current demand (e.g., by energy consuming devices 315), and, further, determines that an energy resource has reserve capacity, the micro-grid manager sends SIP control messages (e.g., similar to a set point control), via the presence server (e.g., presence server 206A), to one or more energy resources in the micro grid instructing the energy resources to generate more energy. At step 825, the presence server of the micro-grid acknowledges the message from the micro-grid manager and notifies the device (e.g., energy resource 310) to comply with the control. The energy resource device acknowledges the SIP notification and executes the control, increasing its output.

At step 830, the generated output of a controlled energy resource increases as commanded and the energy resource publishes this current state indicating the increased generating output using a SIP message. At step 840, the presence server receives the SIP message providing the new generated output energy resource, acknowledges the message, and notifies the micro-grid manager. At step 850, the micro-grid manager receives the modified output, and acknowledges the messages. The micro-grid manager then recalculates a current state of the micro-grid.

At step 855, if the micro-grid manager detects that the total power generated in the micro-grid is not sufficient to support the demand and, further, determines that no energy resource in the micro-grid had reserve (additional) capacity, then the micro-grid manager controls the energy consumers (e.g., energy consuming devices 315 in the micro-grid) to reduce their demand. For example, the micro-grid manager may issue commands that cause a programmable controllable thermostat to modify its setting or stop a pool pump during a period of increased demand. The presence server(s) acknowledges the reception of SIP home area network control messages and notifies the controlled home area network devices.

At step 860, each controlled device receives the SIP notification, acknowledges it, and processes the control message. For instance, the control message may cause an energy consuming device to shed load as instructed by the micro-grid manager and, thereby, decrease the energy consumption of the home area network. The device then publishes a SIP message with its new energy consumption, which may routed in the similar way to the micro-grid manager via a SIP notification message from the presence server. At step 870, the micro-grid manager receives and processes the SIP notification from the presence server. For example, the micro-grid manager determines the new energy consumption of control home area network device, and recalculates the current electrical state of micro-grid. Steps 820, 830 . . . 870 may be iteratively repeated until the micro-grid is dissolved by the utility operator.

Implementations of the present invention provide numerous advantages including: extending the configuration, monitoring and capabilities provided by the home area networks (e.g., Zigbee®) to external applications; providing real-time and decentralized monitoring and control of distributed energy resources and energy consumption devices at customers' premises to continue providing services to customers even during large scale power outages and improve the reliability and sustainability of micro-grids; maximizing the use of local energy resources to satisfy the local energy demand, thus reducing potential environmental negative impacts; promoting a communication standard to enable decentralized micro-grid management; supporting small to large amounts of home area network devices through the use of well-proven, high performing and low latency communication protocols; and enabling faster services restoration during unplanned events affecting the distribution grid through decentralized micro-grid management.

In exemplary implementations, the invention provides continuing electrical services to customers of a utility operator during planned power outages. For example, in the event a utility operator plans to perform maintenance on a primary feeder line that may affect services to a neighborhood, the utility operator can use a configuration engine (e.g., configuration engine 102) to identify how services could be fully or partially maintained through the configuration of several micro-grids. For example, the utility operator may review the configuration information (e.g. configuration information 136) from the configuration engine to establish switching plans to create the micro-grids. Further the utility operator may review controls through a distribution supervisory control and data acquisition (D-SCADA) system or launch the automated execution of switching plans to isolate the identified electrical pockets to form the micro-grids. Further, the utility operator may enable a decentralized micro-grid management systems (e.g., micro-grid manager 104) to manage the micro-grids. Further, the utility operator may monitor the state and health of micro-grids (via, e.g., micro-grid monitoring and visualization devices).

In embodiments, after the utility operator enables the micro-grid management by the decentralized micro-grid management system (micro-grid manager), the micro-grid manager calculates the current micro-grid state. The micro-grid manager monitors the energy resources and the energy consumption devices in the micro-grid and periodically adjusts the generated power and energy consumption (e.g., switch off/on, increase/decrease, etc). Once the planned maintenance is completed, the dispatcher using the centralized advanced distribution management system disables the control of micro-grids by the micro-grid manager and reconnects the micro-grids to the rest of electrical grid.

In exemplary implementations, the invention maintains and/or restores services during unplanned power outages. For example, a storm, disaster, or unplanned event may create power outages in various locations. The utility operator responsible for the affected grid and customers must restore services promptly. To do so, in addition to leveraging the advanced functions offered by distribution and outage management systems, the utility operator uses the configuration engine to identify portions of the distribution grid that can be isolated and configured as micro-grids. The utility operator can then isolate the identified micro-grids.

In implementations, the micro-grids could initially be either energized or de-energized (i.e., powered and unpowered). Once isolated, the utility operator enables the micro-grid management system to take ownership of monitoring and control of associated electrical pockets. For the energized micro-grids, the associated micro-grid manager starts controlling the available distributed energy resources and home area network controllable loads, ensuring the sustainability and reliability of micro-grids as well as the power quality. For the de-energized micro-grids, the associated micro-grid manager can initiate a blackstart (i.e., begin from an unpowered state) of the micro-grid. To do so, the micro-grid manager isolates the premises in which distributed energy resources are available and sends signals to the energy resource to start generating. Once each of the premises having an energy resource is viable, the micro-grid manager connects, one at a time, a neighborhood premises, ensuring that all controllable and non-required loads within the premises to connect are turned-off. Once all premises within the micro-grid are connected, and the controllable loads have been brought online based on the generating power produced by the available energy resources, the micro-grid manager switches to a normal operational mode, continuously monitoring the micro-grid electrical state and controlling as appropriate the available distributed energy resources and energy consuming devices.

In exemplary implementations, the invention monitors micro-grids through micro-grid monitoring and visualization. That is, a utility operator, employees of the operator, and its customers who belong to micro-grids may be notified when the utility operator has configured the distribution network to isolate them from the rest of electrical grid. For example, the micro-grid monitoring and visualization enables customers to visualize the current state of micro-grids through a mobile device, a home energy management system or utilities portal, which presents the following information: total energy demand; total power generation; total reserve; and/or a geographical map of micro-grid showing graphically voltage quality. Further, an owner or operator of an energy resource (e.g., energy resources 310) may be presented the following information: current power output, current estimated reserve, and messages issued by the micro-grid management system to the energy resources. Additionally, an owner or operator of an energy consuming device (e.g., energy consuming device 315) may be presented the following information: current interval usage, load adjustments signals, and controls issued by the micro-grid management system to the various home area network devices. Thus, in such situations, micro-grid monitoring and visualization informs the utility operator and its customers of the state of a micro-grid so that they may adapt their energy consumption to the micro-grid's power generation current capability and reserve.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for configuring micro-grids implemented in a computer infrastructure comprising:
   determining, by a computer device, one or more premises in an electrical distribution grid comprising an energy resource;
   determining, by the computer device, a configuration of the electrical distribution grid;
   determining, by the computer device, a configuration of a micro-grid, the micro-grid comprising the one or more premises in the electrical distribution grid and the micro-grid being configured in the electrical distribution grid; and electrically isolating, by the computer device, the micro-grid from the electrical distribution grid.

2. The method of claim 1, wherein:

the one or more premises comprises a home area network communicatively linking the energy resource and an energy consuming device; and the determining the one or more premises comprises receiving information from the energy resource and the energy consuming device via the home area network.

3. The method of claim 2, wherein the configuration of the electrical distribution grid is determined based on the information received from the energy resource and the energy consuming device, historical information, and forecast information and determining the configuration of the micro-grid includes a blackstart of the micro-grid.

4. The method of claim 2, wherein the home area network communicates using Session Initiation Protocol (SIP) messages.

5. The method of claim 4, further comprising:

registering with a presence server corresponding to the micro-grid; and subscribing to messages published by the energy resource and the energy consuming device.

6. The method of claim 2, wherein the home area network communicates using Message Queue Telemetry Transport (MQTT) messages.

7. The method of claim 1, wherein the electrically isolating the micro-grid comprises causing switching elements in the electrical distribution grid to disconnect the micro-grid from the electrical distribution grid.

8. The method of claim 1, wherein a service provider at least one of creates, maintains, deploys and supports the computer infrastructure.

9. The method of claim 1, wherein steps of claim 1 are provided by a service provider on a subscription, advertising, and/or fee basis and the service provider monitors a current state of the micro-grid through one or more visualization watcher applications.

10. A system for configuring a micro-grid comprising:

a computing system comprising one or more computing devices communicatively linked to an electrical distribution grid via an information network, wherein the one or more computing devices:

receive current condition information from devices in the electrical distribution grid via the information network;

determine one or more premises in the electrical distribution grid for inclusion in a micro-grid based on the current condition information; and control switching elements in the electrical distribution grid to electrically isolate the one or more premises from the electrical distribution grid.

11. The system of claim 10, wherein the one or more premises comprising a home area network communicatively linking one or more of the devices to the information network.

12. The system of claim 11, wherein the determining the one or more premises for inclusion in a micro-grid comprises determining a forecast of near-term conditions in the electrical distribution grid based on the current condition information, historical information, and forecast information.

13. The system of claim 12, wherein the devices communicate using Session Initiation Protocol (SIP) messages.

14. The system of claim 12, wherein the one or more computing devices comprises a micro-grid manager that registers with a presence server corresponding to the micro-grid, and subscribes to messages published by one or more of the devices in the micro-grid.

15. The system of claim 12, wherein the devices communicate using Message Queue Telemetry Transport (MQTT) messages.

16. A computer program product for configuring micro-grids, the computer program product comprising:

one or more computer-readable storage mediums;

program instructions, stored on at least one of the one or more computer-readable storage mediums, to electrically isolate one or more premises into a micro-grid within an electrical distribution grid;

program instructions, stored on at least one of the one or more computer-readable storage mediums, to subscribe to devices in a home area network of the one or more premises; and program instructions, stored on at least one of the one or more computer-readable storage mediums, to modify power flow in the micro-grid based on current condition information provided from the devices via the home area network.

17. The computer program product of claim 16, further comprising:

program instructions, stored on at least one of the one or more computer-readable storage mediums, to determine a forecast of near-term conditions in the electrical distribution grid based on the current condition information, historical information, and forecast information; and program instructions operate in real time.

18. The computer program product of claim 16, wherein electrically isolating the one or more premises into the micro-grid comprises validating a switching plan by verifying the micro-grid will be viable once disconnected from the electrical distribution grid and controlling switching elements in the electrical distribution grid to electrically isolate the premises from a remainder of the electrical distribution grid.

19. The computer program product of claim 16, wherein:

the home area network communicates using Session Initiation Protocol (SIP) messages; and subscribing to the devices in the home area network of the premises comprises registering with a SIP registrar.

20. The computer program product of claim 16, wherein the devices communicate using Message Queue Telemetry Transport (MQTT) messages.

21. The computer program product of claim 16, wherein controlling the power flow comprises issuing control messages to the micro grid that causes an energy resource in the micro-grid to increase energy output.

22. A computer system for configuring micro-grids in an electrical distribution grid, the system comprising:

one or more processors, one or more computer-readable memories and one or more computer-readable storage mediums;

program instructions, stored on at least one of the one or more computer-readable storage mediums for execution by at least one of the one or more processors via at least one of the one or more memories, to receive current condition information from a plurality of home area networks in premises of an electrical distribution grid;

program instructions, stored on at least one of the one or more computer-readable storage mediums for execution by at least one of the one or more processors via at least one of the one or more memories, to determine configuration information for the electrical distribution grid, the configuration information providing a topology of the electrical distribution grid to form a micro-grid, wherein the micro-grid is an electrically isolated portion of the electrical distribution grid that comprises one or more of the premises;

program instructions, stored on at least one of the one or more computer-readable storage mediums for execution by at least one of the one or more processors via at least one of the one or more memories, to control switching elements in the electrical distribution grid based on the configuration information;

program instructions, stored on at least one of the one or more computer-readable storage mediums for execution by at least one of the one or more processors via at least one of the one or more memories, to exchange information with energy resources and energy consuming devices in one or more of the home area networks in the micro-grid; and program instructions, stored on at least one of the one or more computer-readable storage mediums for execution by at least one of the one or more processors via at least one of the one or more memories, to control power flow between the energy resources and the energy consuming devices.

23. The computer system of claim 22, wherein the determining configuration information for the electrical distribution grid comprises determining a forecast of near-term conditions in the electrical distribution grid based on the current condition information, historical information, and forecast information.

24. The computer system of claim 22, wherein the exchanging information with energy resources in the micro-grid and the energy consuming devices in one or more of the home area networks comprises:
  registering with a SIP registrar corresponding to the one or more of the home area networks in the micro-grid; and
  subscribing to SIP messages of the energy resources and the energy consuming devices in the one or more home area networks.

25. A method of deploying a system for configuring micro-grids in an electrical distribution grid, comprising:
  providing a computer infrastructure, being operable to:
    subscribe to devices registered with a presence server corresponding to a micro-grid;
    receive current condition information published in messages by the devices via the presence server;
    determine whether total power generated within the micro-grid will exceed power demanded within the micro-grid;
    transmit control messages to one or more of the devices via the presence server that cause the one or more devices to modify power provided or consumed by the one or more of the devices based on the determining; and
    transmit control messages to one or more control devices to modify a topology of the electrical distribution grid to add one or more additional devices to the micro-grid.

* * * * *